Patented Mar. 31, 1931

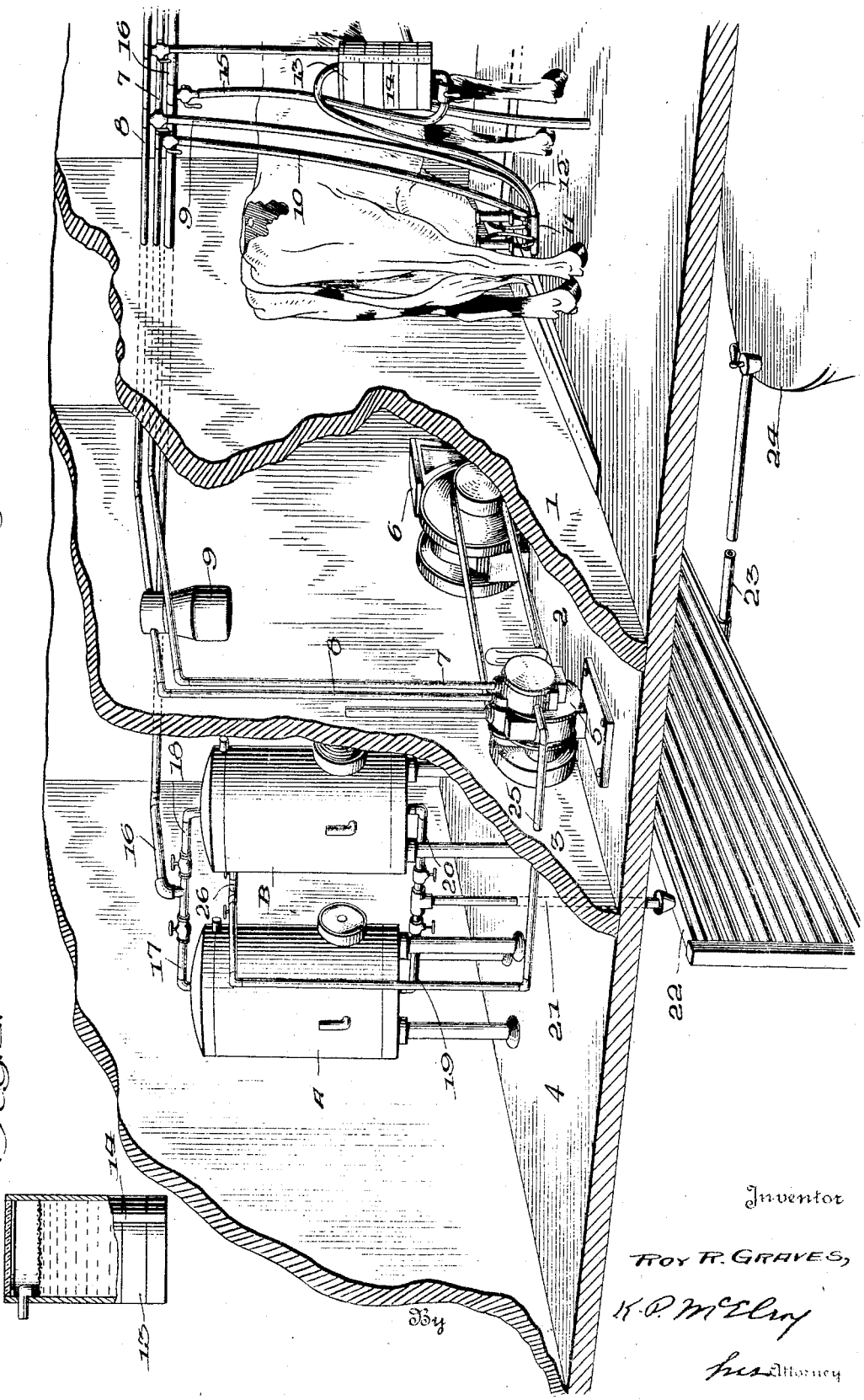

1,798,413

UNITED STATES PATENT OFFICE

ROY R. GRAVES, OF KENSINGTON, MARYLAND

PRODUCTION OF VITAMIN CONTAINING PASTEURIZED MILK OF LOW BACTERIAL CONTENT

Application filed October 14, 1927. Serial No. 226,133.

This invention relates to production of vitamin containing pasteurized milk of low bacterial content; and it comprises mechanically milking a cow under aseptic conditions, transmitting the milk from the udder to a pasteurizing apparatus without access of air via a receptacle wherein said milk is stored for a time at body temperature to permit germicidal action, pasteurization of the milk being at a temperature advantageously around 145° to 165° F.; all as more fully hereinafter set forth and as claimed.

The production of sanitary milk at economical prices is of special public importance. Market milk is usually produced as pasteurized milk or as certified milk. Pasteurized milk is milk which is generally collected from a number of farms, taken to a central point and there treated in special pasteurizing apparatus. Usually the cows are milked directly into open receptacles and the milk is transferred to large receptacles and these are transported by wagon to a railroad center and shipped thence to a pasteurizing plant. Pasteurization is not done, as a rule, until some hours after the milking and prior to pasteurization the milk has opportunity to come into contact with air under several different conditions, including the milking, transferring from the milk pail and delivery to pasteurizing apparatus. Certified milk is used for most part by invalids, infants and others desiring a fresh milk that is of especially low bacterial content. Certified milk is raw milk produced under unusually sanitary conditions. Special costly barns within which the herds are housed are necessary, there is a large amount of labor necessary for washing and grooming of the cows, frequent washing of the barns, the laundering of clothing of the employees, the medical examination of the employees, etc., all resulting in increasing the cost of production and therefore the sales price of certified milk. But even with all the precautions taken, the raw milk may still possibly be infected by some animal or man borne disease, such as tuberculosis, typhoid, septic sore throat, fever resulting from *B. abortus*, etc.

The present invention produces high grade market milk in a manner different from either of these ways. Milk may contain bacteria of many different kinds, but they can be classified in the usual three main classes, aerobic, anaerobic and facultative aerobes. The bacteria coming from the udder are mainly aerobic, that is require air for life, while most of the bacteria coming from gross contamination by manure and other decaying matter are also aerobic. The latter bacteria are largely spore bearing. In the present invention I suppress the growth of aerobic bacteria and prevent their presence to a very large extent by maintaining the milk under vacuum conditions with exclusion of external air from first to last; that is from the cow's udder to the milk bottle. With exclusion and suppression of this class of bacteria the useful effect of pasteurization is much enhanced. Pasteurization can usually be relied upon to kill 98 per cent or so of the viable bacteria present and it of course makes considerable difference how many bacteria are originally present since some 2 per cent of the number present are apt to survive pasteurization; the 2 per cent representing of course the more hardy types; which are mostly aerobes. For further restricting the amount of bacteria present in the milk at the time of pasteurization I utilize another expedient. Milk as drawn has a certain amount of germicidal power when maintained at body temperature. That is, if the milk be drawn with a certain bacterial content and be stored at body temperature the number of variable bacteria decreases progressively during a certain period of time. Ordinarily, the greatest decrease is during the first hour after being drawn; that is a curve showing the bacterial content of milk thus stored reaches its lowest point within sixty minutes from the time the milk is drawn from the udder.

In accordance with the present invention I milk cows under aseptic conditions, using mechanical milking apparatus and using precautions to see that no bloody milk is drawn, and I deliver the milk while at body temperature to an apparatus, preferably a heat-insulated tank, in which the milk is maintained at or near the body temperature for a period of an hour. While as stated the number of bacteria reaches its minimum in the first hour after being drawn there is no substantial increase within the next fifteen to twenty minutes. All these operations are done without access of air to the milk at any time. Maintaining the milk at about 98° F. for about an hour allows me to take advantage of the germicidal action described, and in so doing at this early stage of the operation I materially reduce the bacterial count so that in the subsequent stages of my operation I pasteurize a milk having an unusually low bacterial content. After the milk has been maintained for about an hour in the heat-insulated tank, I then pasteurize it, (advantageously in the same tank), at temperatures around 145° to 165° F., and then immediately deliver the so pasteurized milk past a cooler and directly into a bottling machine of closed type. At no time from the milking of the cows to the final bottling do I allow the milk to come into contact with the air; thereby precluding accidental contamination with aerobic bacteria and maintaining conditions under which such as are present are prevented from multiplying.

In the accompanying drawing I have shown apparatus useful in the performance of my process.

Fig. 1 is in section with part of the milking barn and pasteurizing house shown in elevation, and Fig. 2 is a sectional elevation of the measuring receptacle.

The barn is divided into a number of stalls 1, usually six on a side. The end one only is shown. Adjacent the end stall is a pump house 2 divided by a partition 3 from a pasteurizing room 4. Adjacent the pasteurizing room are a cooler and bottling machine (hereinafter referred to). They may be located in the pasteurizing room 4, the arrangement here shown being diagrammatic. In the barn the cows are milked with machines of the releaser, relay or New Zealand type. The machine shown comprises a vacuum and pulsation pump 5 operated by motor 6 and having a pulsation line 7 and a vacuum line 8, the vacuum line leading past the usual sanitary trap 9. Leading from the pulsation and vacuum pipes 8 and 7 are lines 9 and 10 respectively connected to the milking machine 11. Operation of this type of device is well known, the pulsation and vacuum effecting milking. Leading from the milking machine is a line 12 delivering the milk to any usual type of measuring receptacle that shown as 13 is provided with a glass gage 14. The receptacle shown has a fine screen under glass at its entrance so that a glance will detect gargety or bloody milk. If such should be seen the milk is removed from the receptacle without entering the sanitary pipe line and the pasteurizer. Leading from the measuring receptacle is a valved line 15 in communication with the vacuum line 16, this in turn leading to the vacuum tanks A and B of the pasteurizing apparatus. Tanks A and B may be filled alternately through the valved connections 17 and 18 and may be emptied alternately through the valved connections 19, 20 and 21. The line 21 leads to the cooling device 22 from which cooled or refrigerated milk is conducted by pipe 23 to diagrammatically shown bottling apparatus 24. A vacuum is maintained in tanks A and B by means of the main pump 5 having a connection 25 leading to tanks A and B through the valved branch 26.

In one way of operating my process, using the apparatus described, cows to be milked are groomed and taken in units of six, or other desirable number, to the special milking barn. Here they are milked by the milking device which draws the milk by vacuum from the cow's udder into the sanitary pipe line 16 located on the shed framework above the cows. Between the line 16 and the milking apparatus 11 is the receptacle 13 which serves for measuring the quantity of milk delivered by each cow. The pasteurizing tanks A and B are heat-insulated and the milk is delivered to either one of them, according to the setting of the valves on lines 17 and 18. When one is full the other is being filled. The milk is held in either one of these tanks A or B at about the temperature it is delivered from the cow, around 98° F. Ordinarily I do not desire to hold the milk in either of these tanks for more than an hour before pasteurizing for the reasons hereinbefore stated. When the milk has been held in the tank for from thirty minutes to an hour, part of this time being consumed in filling, the temperature is then raised to 140–165° F., depending upon whether the "holding" or the "flash" process is used. If the "holding" process is used the milk is maintained under a temperature of 145° F. for about thirty minutes. If the "flash" process is used, the milk is flashed at about 165° F. The milk is then drawn from either of the tanks past the cooler 22 and from the cooler into the covered bottling machine 24.

The two pasteurizing tanks A and B may each hold from 50 to 75 gallons. When one tank has been drawn full of milk the new incoming milk will be switched to the other tank and this second tank will be filled while the first tank is being pasteurized. The two tanks thus alternate in filling and pasteurizing until the milking is completed. With a six-cow milking unit in operation, approximately 50 gallons of milk will be drawn per hour. As stated, the milk in each of the tanks A and B should be maintained at body temperature before pasteurizing and cooling. Usually an hour is sufficient for this purpose. This maintenance of the milk at body temperature for a relatively short period is advantageous. While the bacterial content of the milk delivered to the pasteurizer directly from a cow is low, still milk from healthy cows usually contains some bacteria. But milk from normally healthy cows also contains some bactericidal constituents which destroy many of the bacteria commonly found in milk. This destruction of bacteria is termed "germicidal action." The duration of such germicidal action varies with the temperature of the milk and the length of time elapsed after milking. The closer the temperature of the milk is kept to body heat the greater will be the decrease of bacteria for a short period of time immediately following milking. Therefore the holding of the milk in the pasteurizing tank before pasteurization less than an hour following milking not only prevents any increase of bacteria in the milk, but, because of the germicidal action described, results in a decided decrease.

The function of the vacuum in the described process is twofold; by exclusion of air contamination with air borne bacteria is prevented and unfavorable conditions for the life of aerobic bacteria are created. Incidentally, with the line sealed for vacuum mechanical contamination is also prevented.

While I have described preservation of a vacuum only up to and including pasteurizing, it is advantageous to hold the vacuum during bottling if bottled milk is to be provided. In so doing, vacuum exists at all times on the milk after it leaves the udder and until it is sealed in bottles. When vacuum sealing in bottles is used, pasteurization can of course be after bottling.

Another and very great advantage of the present invention is the preservation of the natural vitamins of the milk. In pasteurizing milk in the presence of air, vitamin C is destroyed. By pasteurizing in the absence of air, as in the present invention it survives. In the absence of air the heat of pasteurization also exercises less detrimental action on vitamins A and B.

What I claim is:—

1. In the economical production of high grade market milk having a high vitamin and low bacterial content the process which comprises milking a cow and transferring the milk to a pasteurizing apparatus under vacuum conditions without release of the vacuum during the transfer, the milk allowed to remain under vacuum conditions at body temperature for from thirty to sixty minutes, prior to pasteurization.

2. In the economical production of high grade market milk having a high vitamin and low bacterial content the process which comprises milking a cow by an apparatus of the vacuum type, transmitting the milk without breaking the vacuum to a storage chamber, allowing it to remain in the storage chamber at substantially body temperatures, for a time sufficient to effect a diminution in the bacteria present and thereafter pasteurizing under vacuum.

3. In the economical production of high grade market milk having a high vitamin and low bacterial content the process which comprises milking a cow by an apparatus of the vacuum type, transmitting the milk without breaking the vacuum to a storage chamber, allowing it to remain in the storage chamber at substantially body temperature, for a time sufficient to effect a diminution in the bacteria present, thereafter pasteurizing under vacuum, cooling and bottling under vacuum conditions; all without access of air to the milk at any time during its progress between udder and bottle.

4. In the economical production of high grade market milk, the process which comprises milking the cow, allowing the milk to remain without substantial rise in temperature for a time amounting to from 30 to 60 minutes, to effect a diminution in the bacteria present, cooling the milk and packaging it; all under vacuum conditions.

In testimony whereof, I have hereunto affixed my signature.

ROY R. GRAVES.